H. S. HALLWOOD.
RECORDING LOCK.
APPLICATION FILED JUNE 2, 1904.

937,370.

Patented Oct. 19, 1909.
4 SHEETS—SHEET 1.

Witnesses:
Frank A. Loeffler
A. S. Hull

Inventor.
Henry S. Hallwood
By Fouts & Hull
Attorney.

H. S. HALLWOOD.
RECORDING LOCK.
APPLICATION FILED JUNE 2, 1904.

937,370.

Patented Oct. 19, 1909.
4 SHEETS—SHEET 2.

WITNESSES:
Frank A. Loeffler
A. S. Hull

INVENTOR.
Henry S. Hallwood
BY Fouts & Hull
ATTORNEY.

H. S. HALLWOOD.
RECORDING LOCK.
APPLICATION FILED JUNE 2, 1904.

937,370.

Patented Oct. 19, 1909.
4 SHEETS—SHEET 3.

Witnesses:
Frank A. Loeffler
A. S. Hull

Inventor:
Henry S. Hallwood
By Fouts & Hull
Attorney

UNITED STATES PATENT OFFICE.

HENRY S. HALLWOOD, OF COLUMBUS, OHIO, ASSIGNOR, BY MESNE ASSIGNMENTS, OF ONE-THIRD TO J. F. PIXLEY, ONE-SIXTH TO C. H. PUMPHREY, ONE-THIRD TO ALICE S. WELLS, AND ONE-SIXTH TO MARTHA S. PARK, ALL OF COLUMBUS, OHIO.

RECORDING-LOCK.

937,370. Specification of Letters Patent. Patented Oct. 19, 1909.

Application filed June 2, 1904. Serial No. 210,884.

*To all whom it may concern:*

Be it known that I, HENRY S. HALLWOOD, residing at Columbus, in the county of Franklin and State of Ohio, have invented a certain new and useful Improvement in Recording-Locks, of which the following is a full, clear, and exact description, reference being had to the accompanying drawings.

This invention relates to recording mechanisms and more particularly to those mechanisms of that character which are intended to give information concerning the person who has operated the same and also to show the exact time when such operation was effected.

The present invention relates to a recording door lock, the same being adapted to be operated by any one of a series of keys, or any one of a series of combinations for which the lock may be constructed, said keys or combinations determining what character will appear upon the record when the lock is operated. In addition to the impression showing the key or combination employed, which key or combination is assigned to some particular person, I have provided an hour and a minute wheel, and also a day and a month wheel, said wheels carrying impression characters upon their peripheries, which characters are adapted to be lined up so as to give a printed record showing the minute and hour, as well as the day and month when the impression was made.

My invention is an improvement over that described in the patent to Allen De Vilbiss, No. 735,034, dated July 28, 1903, said improvements having for their objects the modification of the structure shown in said patent whereby the device is rendered more accurate and certain in its operation, and more economical in its manufacture.

In the accompanying drawings forming part of this application.

Referring now to the drawings, in which similar reference characters designate corresponding parts throughout the several views, 1 represents the casing of the lock, the same being a rectangular box that is open at its front, said front being adapted to be closed by the cover 2. The casing 1 is intended to be secured to the door of a store or other building in a manner common to door locks, a portion of said door being indicated in dotted lines in Fig. 2. Suitably mounted within the casing almost midway between its upper and lower ends is a locking bolt, said bolt comprising an enlarged engaging end 3 and an operating portion 4, said portion 4 being slotted at 5 in order that it may be properly guided within the casing, a screw 6 extending through the slot for that purpose.

Figure 2:
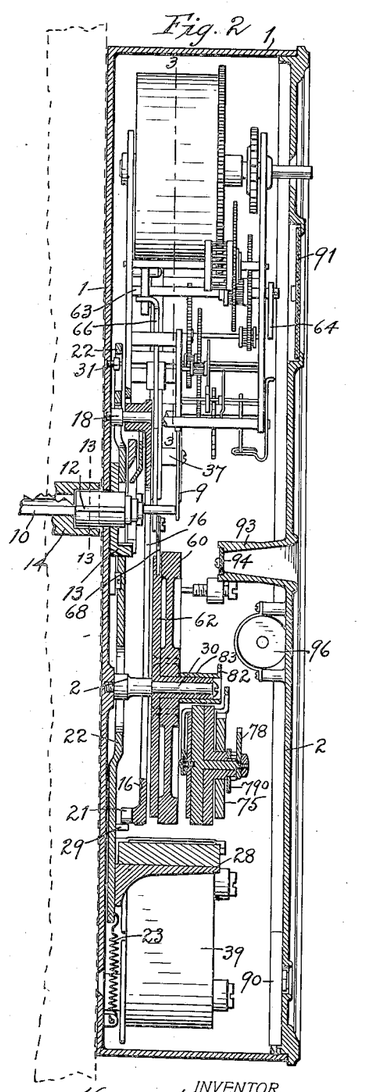
Fig. 2 is a sectional view taken vertically through the lock on the line 2—2 of Fig. 1, the clock mechanism being shown in side elevation.
Figures 7, 13:
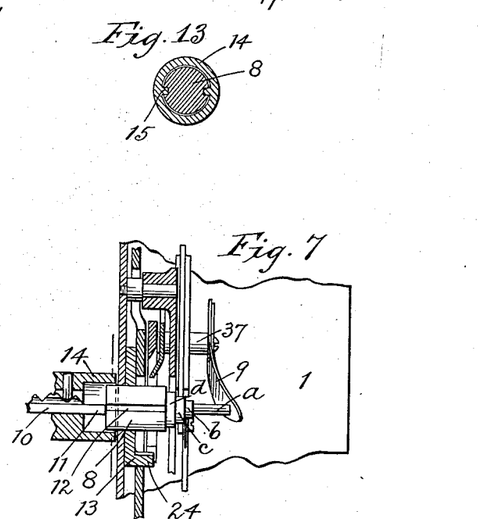
Fig. 7 is a detail view in section showing the stepped cam for controlling the key segment, said cam being pushed inwardly by the key, which key has an extended inner end.
Fig. 13 is a sectional view through the key barrel and cam, the same being taken on line 13—13 of Fig. 2.
Figure 8:
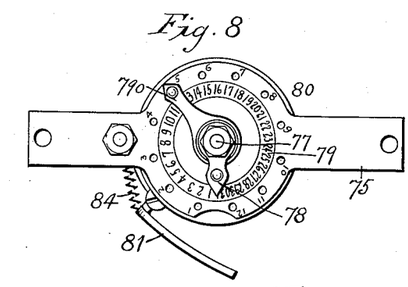
Fig. 8 is a front elevation of the dating mechanism.
Figure 9:
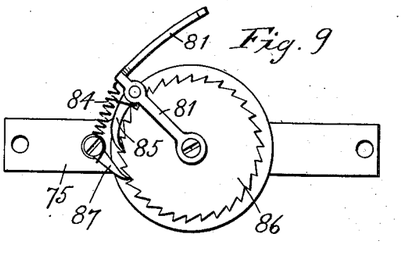
Fig. 9 is a rear view of the same mechanism, showing the arrangement of the pawls for turning and holding the day wheel.

Substantially at the center of the portion 4 and on its lower edge there is formed an irregularly-shaped slot or notch 7, within which slot or notch projects from the rear of the lock the stepped cam on the end of a bar 8. This stepped cam is normally held in its extreme rearward position by a spring 9 which bears upon its forward end, as shown particularly in Fig. 7. The said cam is located so as to be engaged by the forward ends of the keys 10 as they are inserted in the lock, or the keys may engage with the end of a bar that is connected with the cam, said keys pushing the cam inwardly distances depending upon the length of the extended portions 11 on the keys. Fig. 2 shows a key which has practically no extension of this character, and which, therefore, moves the cam inwardly to its slightest extent, while Fig. 7 shows a key with a longer extension, said key having pushed the cam inwardly to its maximum extent. As shown in the drawings, a lock of the ordinary Yale type is employed, although this is obviously a matter of choice with the manufacturer and user.

The stepped cam 8 is provided at diametrically opposite points with slots 12, into which project lugs that are formed on a tumbler 13 that surrounds the cam, such a construction forcing the tumbler to turn with the cam. In Fig. 13 I have shown a section through the rear end of the cam and the forward end of the key barrel 14, from which it will be seen that the said barrel has extensions 15 (see Fig. 13) which project into the slots 12 on the cam, thus forcing the latter to turn with the barrel, the rotation of the key being thus transmitted through the barrel and cam to the tumbler 13. One side of the stepped cam 8 is flattened, as is indicated at 15', and when the tumbler is in its normal position, an arm of the printing segment 16 lies against said flattened side, being held thereagainst by a coiled spring 17. This printing segment is mounted to turn upon a stud 18 that projects from the rear of the casing substantially above the stepped cam 8, said cam projecting between the arms of the segment. As appears most clearly from Fig. 6 of the drawings, the segment 16 is provided on its lower end with a series of impression characters 17', said characters designating the different keys with which the lock is designed to be operated. As each key is assigned to a particular person, it will be seen that said characters 17' designate the persons to whom such keys are intrusted. As shown in said Fig. 6, the segment carries the letters A, B, C and D, although it will be obvious that other characters, such, for example, as numerals, may be used instead. As will hereinafter appear, these characters are to be used in connection with a printing platen to print a character upon a record strip. I desire to state, however, that different kinds of impression devices may be used instead of printing type, it being within the scope of my invention to provide the segment 16 with any form of character impressing devices. I may also state that it is within the scope of my invention to operate the lock by other means than the keys shown, such, for example, as the ordinary combination lock, said lock being designed to move the stepped cam 8 to distances corresponding to the combination employed. From this description it will be understood that the stepped cam is normally retracted by the spring 9 so that the smallest part $a$ (Fig. 7) of the cammed end thereof contacts with the segment. When the key with no extension shown in Fig. 2 is employed, the stepped cam will be turned, but it will not be moved forwardly and, consequently, the segment will not be swung at all. The key with the shortest extension will thrust the cam outwardly until the step $b$ thereon, (Fig. 7), will be in position to engage and move the segment. The steps $c$ and $d$ of the plunger are likewise brought into operative position by their respective keys, and when the latter are turned the segments will be swung to bring characters thereon corresponding with the keys employed to the printing line. The rear side of the segment 16 is provided with a flange 19 through which are cut slots 20, the flange between said slots forming teeth 21, for a purpose hereinafter stated.

Figure 3:
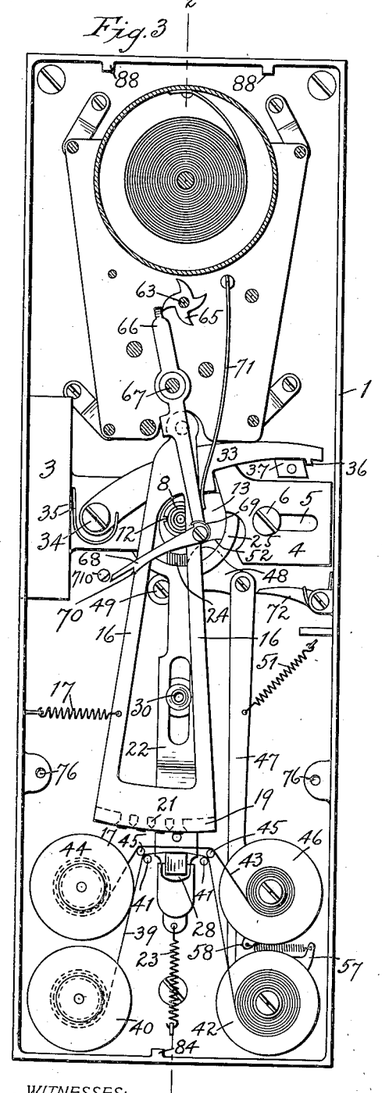
Fig. 3 is a view, partly in section and partly in front elevation, of the lock, the same being taken on the line 3—3 of Fig. 2, and the time and dating wheels being removed.
Figure 4:
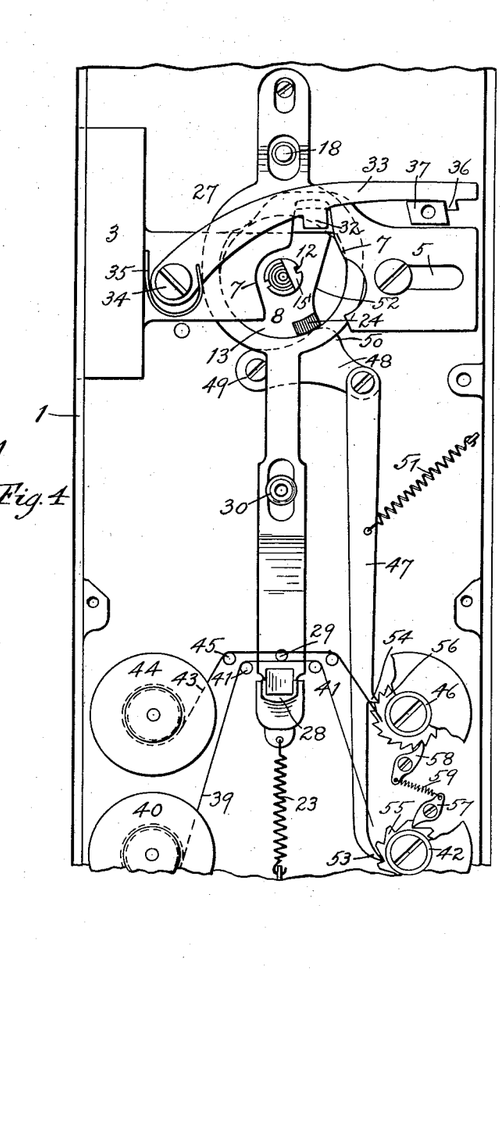
Fig. 4 is a front elevation of the locking bolt and the printing mechanism showing the parts in the position they assume just after the paper and the printing ribbon have been moved.
Figure 11:
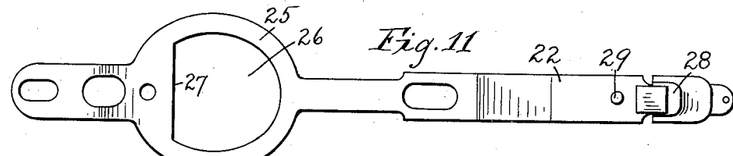
Fig. 11 is a front elevation of the platen bar, and the cam carried thereby which coöperates with the tumbler.
Figure 12:
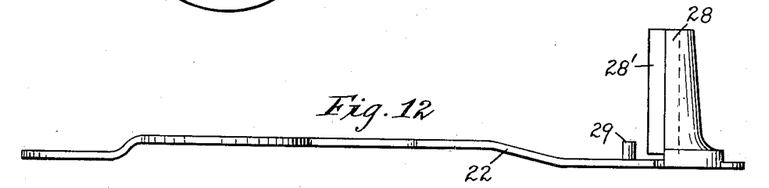
Fig. 12 is a side view of the bar shown in Fig. 11.

Suitably mounted upon the back of the casing, and extending vertically therein there is a platen bar 22, said bar being shown in detail in Figs. 11 and 12 of the drawing. This bar is normally pulled into its lowermost position by means of a spring 23 that is attached to its lower end and it is adapted to be moved upwardly by means of a lug 24 on the tumbler 13. In order that the tumbler may properly engage with the bar, the latter is provided with a rounded enlargement 25 in which is formed a cam opening 26. This opening is circular in contour except at its upper end where it is formed with a straight edge 27 that is substantially perpendicular to the axis of the platen bar. When the platen bar is in its normal position, as is shown in Figs. 3 and 4, the cam 8 projects substantially through the center of the cam opening, and the lug 24 contacts with the lower rim of the opening 26. This lug travels in contact with the inner rim of this opening, and, as it reaches the straight edge 27, the platen bar is gradually lifted until it assumes the position shown in Fig. 5.

Figure 6:
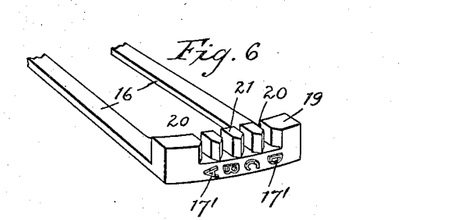
Fig. 6 is a perspective view of the lower end of the key segment, showing the arrangement of type thereon, and also the means for alining the type.

As the lug 24 continues its movement, the platen bar is again lowered to its original position. Toward its lower end the platen bar is provided with a forwardly extending platen 28 which projects opposite the impression characters 17' on the type section. A short distance above the platen the bar is provided with a guide pin 29, said pin being adapted to move between the notches 21 of the type segment as the platen is lifted. These notches are beveled as shown in Fig. 6; and as the pin moves between them the segment will be shifted thereby so as to line up the type on the segment to the exact printing position. The platen bar is guided in its movements by the stud 18, heretofore referred to, and by the studs 30 and 31 that project from the rear of the casing. As appears from the drawings, the stud 30 has a flange that projects over the platen bar and holds it down into position. In order that a more satisfactory impression may be made, the platen 28 is provided with a suitable pad 28'.

Figure 5:
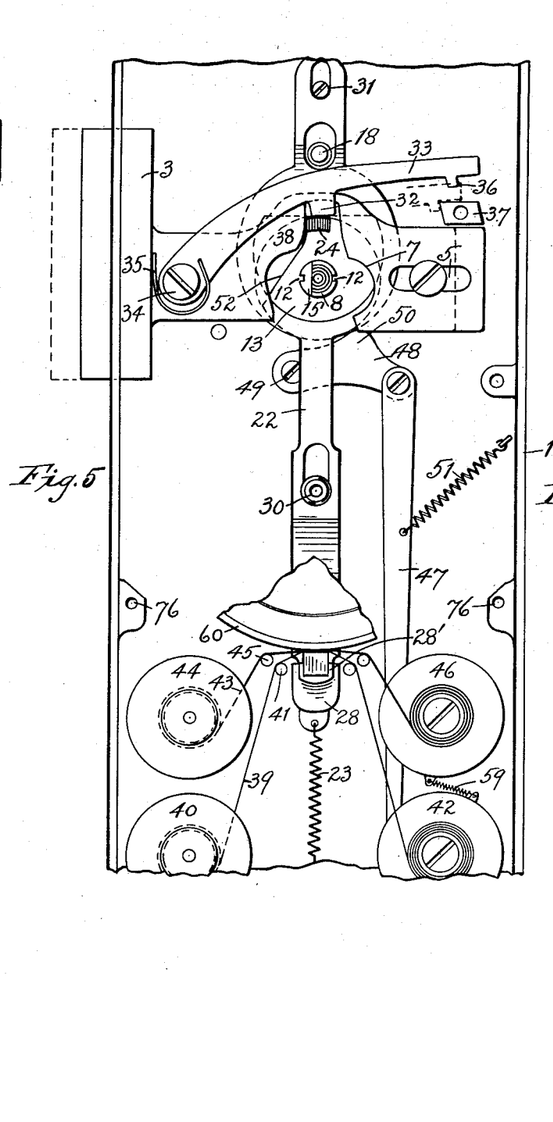
Fig. 5 is a similar view showing the parts in their positions while the printing impression is being made.

The portion 4 of the locking bolt passes over the circular enlargement 25 of the platen bar, and moves transversely thereto, said movement being effected by the lug 24 on the tumbler. As the lug turns about from its position shown in Fig. 4, the bolt will not be moved until the lug reaches almost its extreme upward position, when it will contact with the lefthand edge of the slot or notch 7. Prior to this engagement the lug contacts with a projection 32 on a locking pawl 33 that is pivoted to the locking bolt at 34, said pawl being held downwardly in the position shown in Fig. 4 by a spring 35 that is secured at one of its ends to the pawl and bears with its opposite end against the enlarged head 3 of the bolt. Near the right hand end, this pawl is provided with a tooth 36 that is adapted to engage with the sides of a post 37 that projects forwardly from the rear of the casing. When in the position shown in Fig. 4, this tooth 36 and post 37 will prevent the outward movement of the locking bolt unless the pawl be first released so as to clear the tooth from the post. When the bolt is moved to its outer position, this pawl drops down and engages with the left hand side of the post, as indicated in dotted lines in Fig. 5, and when in this position it will prevent the inward movement of the bolt until the pawl is again lifted. Just before the lug 24 engages with the projection 32, it contacts with the straight edge 27 of the cam opening 26 in the platen bar, and lifts the platen into printing position as shown in Fig. 5. The engagement of the lug with the left hand side of the notch 7 continues to move the bolt outwardly until the lug passes the point 38 of said notch, after which the further movement of the lug will have no effect upon the locking bolt. From this description it will be seen that prior to the movement of the locking bolt, the platen has been raised to make an impression. Likewise, if the tumbler were turned in the opposite direction after the bolt had been entirely shot the lug would engage with the straight edge 27 of the platen bar, and would move the latter to make an impression before the bolt had begun its movement. A printing impression is thus made each time the lock is operated to lock or unlock the door; and it is even operated if the tumbler is arrested and returned, provided its movement has been sufficient to lift the locking pawl 33 so as to release the bolt.

Figure 16:
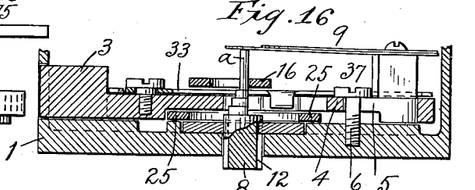
Fig. 16 is a transverse section taken through the center of the locking bolt.

The post 37 above described, serves as a means of attachment for the spring 9 which retracts the plunger 8. In order that the platen bar will not interfere with the locking bolt, the latter is cut away on its rear side to accommodate said bar, as is shown in Fig. 16.

Figure 1:
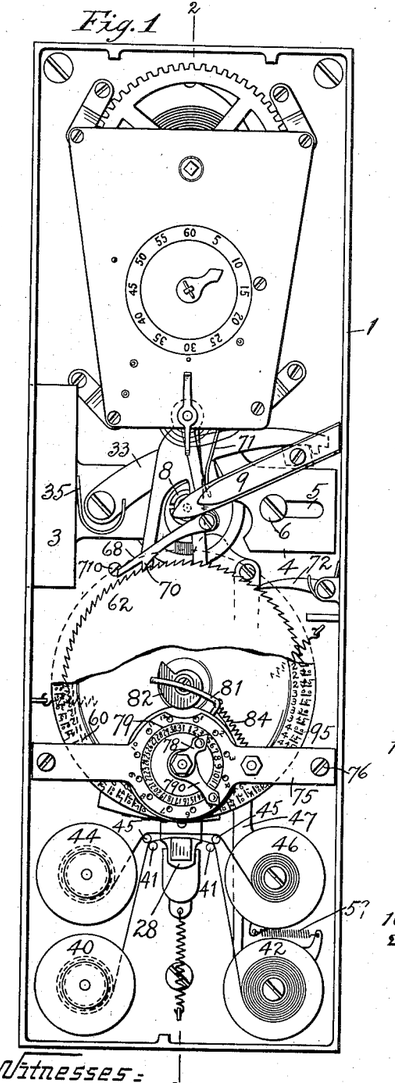
—Figure 1 is a front elevation showing the interior mechanism of my improved lock, the lid being removed and a portion of the hour and minute wheel being broken away.

The paper strip upon which the record is printed is shown at 39, and it is carried from the reel 40 over guide rods 41 to a reel 42 pon which it is wound. An inking ribbon 43 is carried from the reel 44 over guide rods 45 to the receiving reel 46. The reels 42 and 46 are each turned to wind the paper and the ribbon thereon by means of a long pawl 47 that is attached at its upper end to a horizontal cam lever 48, said lever being pivoted to the casing at 49. The lever 48 has a rounded projection 50 on its upper side that is adapted to be engaged by the lug 24 on the tumbler 13, which engagement results in depressing the pawl 47 against the tension of a spring 51 that is attached to said pawl and to the casing. The tumbler 13 is cut away at 52, so that when the parts are in normal position as shown in Figs. 1 and 3, the cam projection 50 extends into this cutaway portion so that the pawl 47 is lifted. Immediately upon the movement of the tumbler from the position shown in these figures, the lug 24 pushes the cam lever 48 and the pawl downwardly. This pawl has a pair of teeth 53 and 54 which engage with ratchet wheels 55 and 56 upon the reels 42 and 46 respectively. As will be seen from Fig. 4, the teeth on the ratchet wheel 56 are greater in number than the number of the teeth on the ratchet 55, in order that the paper strip may be fed a greater distance than the inking ribbon. Detent pawls 57 and 58 engage with the ratchets 55 and 56 respectively to prevent backward rotation of the reels, said pawls being held in engaging position by a single spring 59 connected to the tail-ends of these pawls.

Figure 10:
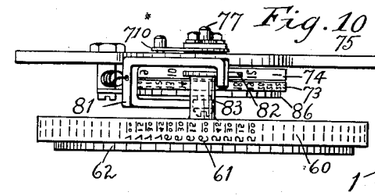
Fig. 10 is a side elevation of the parts shown in Figs. 8 and 9, with the hour and minute wheel also shown in side elevation.

The time recording mechanism consists of an hour and minute wheel 60 that is journaled upon the stud 30 heretofore referred to, said wheel carrying upon its periphery numerals 61 which represent the hours and the minutes, said numerals being arranged as follows:—$1^{00}$, $1^{15}$ $1^{30}$ $1^{45}$ $2^{00}$ etc., there being a different set of numerals for each quarter hour, and there being two series of numerals representing day and night. These two series of numerals are consecutive with respect to each other, and the individual numerals of each set are consecutive, that is, they run from 12 to 12 by quarter-hour periods in each series, the one series following the other. The arrangement of these numerals is clearly seen from an inspection of Fig. 10 of the drawing. Secured in any suitable manner to the wheel 60 on its under side is a ratchet wheel 62, said wheel being provided with one tooth for each quarter of an hour that is represented upon the hour and minute wheel. Said wheel is turned intermittently at intervals of every fifteen minutes by means of a clock mechanism indicated generally in Figs. 2 and 3 by reference sign K which is located, preferably, in the upper part of the casing 1. This clock mechanism may be of any suitable type, and it is not deemed necessary to describe the same in detail. 63 represents a shaft of this clock which corresponds to the arbor for the minute wheel in the ordinary clock, said shaft carrying upon its front end an index hand or pointer 64 for a purpose hereinafter stated. Near its rear end this shaft carries a wheel 65 that is provided with four cam projections that are adapted to successively contact with the upper end of a pawl carrying lever or arm 66, said lever or arm being curved at its upper end to suitably coöperate with the cam projections. The lever or arm is pivoted at 67, and at its lower end it carries a pawl 68 that is pressed downwardly by means of a spring 69 so that a tooth 70 on said pawl will be held in engagement with the teeth of the ratchet wheel 62. The arm 66 is pressed into engagement with the cam projections on the wheel 65 by means of a spring 71 that bears against the arm near its lower end. Bearing in mind that the shaft 63 with the cam wheel rotates once each hour, it will be understood that every fifteen minutes the arm 66 will be cammed over so that the tooth 70 of the pawl will engage behind a tooth of the ratchet wheel 62, and that as soon as the curved end of this arm passes the projection on the wheel 65, the pawl will be kicked forward by the spring 71, which action will result in turning the ratchet wheel, and the hour and minute wheel one numeral forward. In order to prevent the kick on the pawl from overthrowing the ratchet wheel, a post 710 is projected upwardly from the back of the casing in a position to be engaged by the end of the pawl 68. This post is flattened on one side, and the end of the pawl is beveled, with the result that, as the pawl moves to the left in Fig. 3, it will be jammed into the ratchet wheel and will thus arrest the latter just after it has moved the distance of one tooth. The ratchet wheel is prevented from turning in a reverse direction by a detent pawl 72 that is mounted on a stationary part of the casing and is spring-pressed into engagement with the ratchet wheel. The wheel 60 may be set to print the correct hour by simply turning it forwardly about its pivotal stud. For some minutes after the pawl 68 has kicked the wheel forward the pawl and ratchet will be locked together so that the wheel cannot be turned; but, as the shaft 63 and wheel 65 turn, the pawl will be gradually withdrawn until it is freed from the post 710, after which the wheel may be set to print any hour desired.

It is desirable that the record strip should show not only a character for indicating the person who has operated the lock, and the hour and minute of such operation, but that it should also show the day and the month when such operation was effected. To accomplish this result, I provide a day wheel 73 and a month wheel 74 supported by a frame piece 75, said frame piece being fixed to the side of the casing at the points 76. The day wheel is secured to the end of a shaft 77, and the month wheel is loosely journaled thereupon. This shaft projects beyond the frame piece 75, and has a dial hand 78 attached to its end, said hand turning about over a dial 79 that is carried by the frame piece. By turning this hand so that it points out the proper number on the dial, the day wheel will be set so that the same number on the periphery thereof will be brought opposite the printing point. Similarly, the month wheel 74 is connected with a dial hand 790 that is adapted to be turned about over a month dial 80 on the frame piece 75; and when this hand is turned toward a certain number on the month dial, a corresponding number on the periphery of this wheel will be brought to the printing point. From this it will be seen that manually operated means are provided for setting the day and month wheels to proper positions. It is desirable, however, that the day wheel be automatically set, and I therefore place the same under control of the hour and minute wheel, so that upon a complete rotation of said wheel, the day wheel will be turned forward one step. This controlling means consists of a lever 81 that is mounted to rock upon the inner end of the shaft 77 and a cam 82 that is secured to a sleeve 83 that is carried by the hour and minute wheel 60, said cam operating as the hour and minute wheel is turned to move the lever 81 about its pivot. The lever is held against the edge of the cam by a spring 84. The lever 81 carries a pawl 85 that is adapted to engage with the teeth of a ratchet wheel 86, said ratchet wheel being secured to the inner side of the day wheel. A detent pawl 87 engages with the ratchet wheel 86 to prevent backward movement thereof. From this description, it will be understood that as the wheel 60 rotates, the cam 82 will gradually turn the lever 81 about its pivot, thereby causing the pawl 85 to slip backwardly and engage with a tooth of the ratchet wheel. This operation continues until the point of the cam 82 passes the end of the lever 81, when said lever will be thrown backwardly by the spring 84, which movement will cause the pawl 85 to turn the day wheel so as to bring another numeral to the printing point.

The cover plate or lid 2 is adapted to cover the entire front of the lock, the same being held in position by lugs 88 at one end of the casing which engage with sockets in a flange of the lid, and by a lug 89 which engages the bolt of a lock 90 at the opposite end of the lid, said lock being of any suitable character and being operated by a key in any well-known manner. Near its upper end the lid is provided with a window 91 that is opposite the hand 64 on the shaft 63, said hand turning with said shaft, and pointing toward figures in a dial 92 on the front plate of the clock mechanism, said dial being provided with numerals representing the minutes. When the lid is removed from the casing the shaft may be turned by the hand 64 so as to set the clock to any minute that may be desired. This lid is also provided near its center with an inwardly extending circular flange 93, the lower end of which is covered by a glass 94. This glass is opposite the rim of the hour and minute wheel 60, which rim is provided on the side next the glass with characters 95 representing the hours, said characters being so positioned with reference to those on the periphery of this wheel that the observer may see through the window of the casing the hour that has been brought to the printing point. The two windows 91 and 94, therefore, are so positioned that both the hour and the minute can be read directly from the lock, so that the lock serves to give the time of day. In order that the proprietor may know in case the lid 2 has been removed by any unauthorized person, said lid is provided with a registering device, which is indicated at 96, said device adding by successive operations the number of times the lid has been opened.

Figures 14, 15:
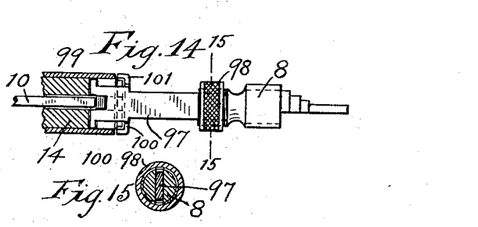
Fig. 14 shows a modification of the connecting mechanism between the key barrel and cam, this structure being preferably employed when the said barrel and cam are applied to a thick door.
Fig. 15 is a sectional view taken on line 15—15 of Fig. 14.

In Figs. 14 and 15, I have shown a modified form of connection between the key-barrel 14 and the tumbler 8, in which the key 10, pushes against a bar 97, said bar being secured at its forward end to the tumbler. While any suitable form of securing means may be employed, I prefer to use that shown in the drawing, in which the rear end of the tumbler is split so as to receive the forward end of the bar. The split portions of the tumbler are clamped against the bar by a nut 98 that is secured upon the former, which is slightly tapered to receive it. At its opposite end the bar enters a slot 99 in the key-barrel, the said end being provided with lugs 100 which extend outwardly in the slot to compel the bar to rotate with the barrel. To prevent the bar from disengaging entirely from the barrel, the end of the latter may be provided with a cover plate 101 with which the lugs engage.

From the foregoing description, it will be seen that I have invented a door register that is simple in construction and positive in operation.

In the claims I have endeavored by the use of generic terms to cover broadly all devices which are intended to accomplish the same results as I secure, and I desire it to be understood that I do not propose to be limited to the details described except as the same may be included in the claims or rendered necessary by the prior state of the art.

Having thus described my invention what I claim as new and desire to secure by Letters-Patent is:—

1. In a recording lock, a locking bolt, means for operating it, a printing mechanism operated by said operating means, and means operating in advance of the operation of the bolt for taking a record from the printing mechanism.

2. In a recording lock, the combination with a key-operated locking bolt, of recording mechanism including an independently driven time indicator, and a recorder coöperating therewith and means arranged to be moved by the key and in advance of the operation of the bolt for actuating the recorder.

3. The combination, with a movable type carrier, differentiated keys each adapted to coöperate with and positively move the type carrier into position for the identification of the key used to be imprinted therefrom, means under the control of the keys for locking the type carrier in printing position, and time-printing devices, time mechanism for controlling the movement of the same into printing position, whereby a simultaneous record may be printed from said time-printing devices and the key-controlled type carrier, a locking bolt also operated by the key and means operating in advance of the operation of the bolt and having a movement toward and away from the printing devices and under the control of each key for taking an imprint from the printing mechanism.

4. In a key-controlled door lock, the combination of a movable type initial printing segment, a series of differentiated initial keys, one for each initial, each key adapted to positively move the initial type segment into position to print the initial of the particular key employed, means for locking the printing segment in printing position and time-printing devices arranged to print simultaneously with the key-controlled type segment, time mechanism for controlling said time-printing devices, a locking bolt adapted to be operated by each key and an impression device operated directly by the keys in advance of the operation of the bolt.

5. The combination, in a recording door lock, with a locking bolt, and means for operating the same, of a time mechanism having a main shaft carrying cam-shaped projections, an operating lever operated by said cam-projections, a spring-tension opposing the cam action, a pawl on said lever, a time type bearing ratchet wheel, said pawl adapted to move said last-mentioned ratchet wheel one number forward each time the lever is released from the cam, a printing platen, key controlled mechanism for operating the lock bolt and the platen, said mechanism arranged to operate the platen in advance of the operation of the bolt.

6. A time and initial recording door lock comprising an initial printing segment, a series of differentiated keys, each corresponding with an initial type on the segment, a clock movement having a main shaft carrying cam-shaped projections, an operating lever operated thereby, a spring-tension against which the cam-projections operate, a pawl on said lever, a time type bearing ratchet wheel, said pawl adapted to move said wheel one number forward each time the lever is released from the cam, and a key-operated printing mechanism adapted to record the time and initial of the key employed at each operation of the lock, said mechanism operating in advance of the operation of the lock.

7. The combination with a locking bolt, a swinging initial type carrier, provided with a curved line of type and having corresponding notches, a guide-pin arranged to engage said notches, and differentiated keys each adapted to operate said bolt and to bring the initial type carrier into printing position according to the particular key employed, of a combined hour and minute printing wheel, a time mechanism for controlling the same, the said time printing wheel arranged to aline the time type into printing position with the initial type on said swinging initial type carrier, and means operating in advance of the operation of the bolt for taking a record from said type carrier and wheels when they are in printing position.

8. In a recording door lock, the combination of a locking bolt, a swinging initial type carrier provided with a curved line of type and notches, a guide pin, means for moving said pin into and out of said notches, differentiated keys having a rotary movement, and each adapted to operate the bolt and to bring said carrier into position to print the initial of the key according to the particular key employed, a combined hour and minute printing wheel, a time mechanism to control the same, a date recording type wheel, said time mechanism operating to move said date wheel forward one step at each revolution of the hour and minute wheel, and a manually operated month wheel, the said time, date, and month printing wheels being arranged to aline the printing type of each with the printing position of the initial type on said swinging initial type carrier, and means operating in advance of the operation of the bolt for taking a record from said alined wheels.

9. In a recording door lock, the combination of a locking bolt, a swinging initial type carrier provided with a curved line of type and with notches, a guide pin, means for moving said pin into and out of said notches, differentiated keys having a rotary movement and each adapted to operate the bolt and to bring said carrier into position to print the initial of the key according to the particular key employed, a combined hour and minute printing wheel, a time mechanism to control the same, a monthly date wheel, means for moving the same one numeral forward upon each revolution of said hour and minute printing wheel, and a manually operated type wheel, the said time, day, and monthly printing wheels being arranged to aline the printing type of each with the printing position of the initial type on said swinging initial type carrier, and a printing platen for taking a record from said alined wheels, a cam for operating the same, the key directly operating said cam in advance of the operation of the bolt.

10. In a recording door lock, the combination of a swinging initial type carrier provided with a curved line of type, differentiated keys having a rotary movement and each adapted to bring said carrier into position to print the initial of the key according to the particular key employed, a combined hour and minute printing wheel, a time mechanism to control the same, a monthly date wheel, means for moving the same one numeral forward upon each revolution of said hour and minute printing wheel, and a manually operated type wheel, the said printing wheels being arranged to aline the printing type of each with the printing position of the initial type on said swinging initial type carrier, means for supporting and feeding a record strip and an ink ribbon, a printing platen adapted to press said record strip and ribbon against the alined type to print the minute, hour, day, and month and operating key initial type each time the lock is operated to lock or unlock the door, and a cam for operating these several parts, said keys adapted to operate said cam.

11. In a recording door lock, the combination of a swinging initial type carrier carrying a curved line of type and having a series of V-shaped notches, one for each initial, a printing platen, a guide pin connected to move therewith and arranged to engage in said notches to properly aline the printing characters on said type carrier, a series of differentiated keys each adapted to move said type carrier into position to print the initial corresponding to the particular key employed, a combined hour and minute printing wheel, a time mechanism for controlling the same, a month printing wheel, connections between said hour and minute printing wheel, a day printing wheel for moving the latter forward one step upon each revolution of the former, a manually operated month printing wheel, the said time, day and month printing wheels being arranged to aline the printing type of each with the printing position of the initial type on the swinging type carrier, a support for a record tape and an inking ribbon, and arranged to hold said tape and ribbon between the printing positions of said wheels and carrier and said platen, and means actuated by the key each time the lock is operated to lock or unlock the door, for actuating said platen to make a record of the minute, hour, day, month, and initial of the operating key.

12. In a recording door lock, a series of differentiated initial keys, an operating bar arranged to move inwardly according to the length of the particular key employed, a lug-bearing tumbler arranged to be engaged by said operating bar, whereby said tumbler is rotated, a printing platen, an operating lever therefor, an eccentric connected to said lever and operated by said tumbler, a stepped cam on said bar, a swinging initial type carrier arranged to be engaged by said stepped cam and to be moved thereby into printing position corresponding to the particular step of the cam engaging the same, a combined hour and minute printing wheel, a time mechanism controlling the same, a day printing wheel, connections for moving the latter one step forward upon each complete revolution of the former, a manually operated month printing wheel, the said time, day, and month printing wheels being arranged to aline the printing type of each with the printing position of the initial type on said swinging type carrier, a support for a record tape and an inking ribbon, and arranged to hold said strip and ribbon between the printing positions of the type on said wheels and carrier and said platen, whereby the record is made of the minute, hour, day, month and initial of the operating key, each time the lock is operated to lock or unlock the door.

13. The combination in a recording door lock, of a series of differentiated initial keys, an operating bar adapted to be moved inwardly according to the length of the particular key employed, a male tumbler carrying a lug, said tumbler being engaged and revolved by said bar, a printing platen, a lever connected thereto, an eccentric engaged by said lug for actuating said lever, a double-pointed ratchet pawl, a pivoted cam-lever carrying the same, said lug engaging said lever, a spring opposing the action of said lever, feed rolls carrying a record strip and an inking tape, ratchets connected to said rolls, said double-pointed ratchet pawl engaging the ratchets on said feed rolls and operating to rotatively displace said rolls through a distance corresponding to one tooth, with each revolution of the cam, a stepped cam on said bar, a swinging initial type carrier arranged to be engaged by said cam to be carried into printing position corresponding to the particular cam engaging the same, a combined hour and minute printing wheel, a time mechanism for controlling the same, a day printing wheel, means actuated by the time mechanism for rotatively moving said day printing wheel one step upon each complete revolution of the hour and minute printing wheel, a manually operated month printing wheel, the said time, day, and month printing wheels being arranged to aline the printing type of each with the printing position of the initial type on the swinging type carrier, the record strip and inking ribbon passing between the printing positions of said type wheels and carrier and said platen, whereby when the lock is operated to lock or unlock the door a record is printed of the minute, hour, day, month, and the initial of the particular key employed.

14. In a recording lock, the combination of a differentiated member, keys adapted to set said member to different positions according to the particular key employed for the lock, a key-designator actuated by said differentiated member, a locking bolt, and an impression device actuated by the key independently and in advance of the operation of the locking bolt to make a permanent record of the particular key employed.

15. In a recording lock, the combination of a differentiated member, a series of differing keys, said keys adapted to set said differentiated member to different positions according to the particular key employed, a key designator arranged to be set to different positions by the differentiated member, a locking bolt, and an impression device arranged to be actuated by each key and adapted to make a permanent record of the designation of the particular key employed, said record being made before the locking bolt is moved.

16. In a recording lock, the combination of a stepped cam, a series of keys each adapted to set said cam to a different position, means coöperating with said cam to designate the particular key employed for setting said cam, a tumbler, a locking bolt, said tumbler being operated when the bolt is operated, and means operated by said tumbler, and in advance of the operation of the locking bolt, for recording the key designation.

17. In a recording lock, the combination of a stepped cam, a series of differentiated keys adapted to set said cam to different positions according to the particular key employed, a key designator coöperating with said cam, a tumbler connected with the cam to be actuated thereby, an impression device coöperating with the key designator to make a record therefrom of the particular key employed, said impression device having a cam portion surrounding the tumbler, and a lug on the tumbler engaging with the cam on the impression device for operating the latter.

18. In a recording lock, the combination of a sliding bar carrying a stepped cam, a series of differentiated keys adapted to move said bar longitudinally to different positions according to the particular key employed, a key designator engaged by said cam and moved to varying distances according to the position to which the cam is set, impression devices coöperating with the key designator to make a record of the particular key employed, a tumbler connected with the bar, said tumbler engaging the impression device to operate the same.

19. In a recording lock, the combination of a bar carrying a stepped cam, a series of keys varying in length, each adapted to move said cam a distance corresponding to the length of the key employed, a type carrier coöperating with the cam and moved thereby a distance corresponding to the position to which the cam is set by the various keys, a platen coöperating with the type carrier, a tumbler connected with the bar and rotated thereby, a lug on said tumbler, and means on the platen with which said lug engages to move the platen against the type carrier.

20. In a recording lock, the combination with a sliding bar carrying a stepped cam, a pivotally mounted type carrier having a portion extending into contact with the stepped cam, a series of keys differing from each other in length and each adapted to slide said bar and cam a distance corresponding to the length of the particular key employed, a printing platen arranged to coöperate with the type carrier to make a permanent record of the particular key employed to operate the cam, a tumbler connected with the bar to rotate therewith, an eccentric-shaped cam surrounding the tumbler, and a lug on the tumbler engaging said cam, and connections between said cam and platen for operating the latter.

21. In a recording lock, the combination with a locking bolt, a designating device adapted to be set to different positions according to the particular key employed for operating the same, said designating device carrying characters respectively representing the keys, a time wheel carrying characters representing hours and minutes, a clock mechanism, a pawl actuated by said clock mechanism for turning the time wheel, and an impression device coöperating with the said designating means and the time wheel and operating in advance of the operation of the locking bolt to make a record of the particular key employed for each operation of the lock and of the time when such operation is effected.

22. In a recording lock, the combination of designating means, a series of keys differing from each other in the length thereof means arranged to be engaged by the keys while being inserted in the lock to be moved thereby into position to engage and set said designating means to different positions according to the length of the particular key employed, a lock adapted to be operated by each key a time wheel carrying printing characters representing hours and minutes, an impression device coöperating with the designating means and the time wheel and operating in advance of the operation of the locking bolt a clock mechanism, a lever operated by said clock mechanism, a pawl carried by said lever, a ratchet wheel on the time wheel and engaged by said pawl, and means for locking the pawl to the time wheel to prevent the overthrow of the latter.

23. In a recording lock, a locking bolt, a movable type carrier, a key-operated cam arranged to operate both said bolt and said type carrier, said cam moving said type carrier into varying positions according to the particular key employed to operate the same, time mechanism, time printing devices under the control of the time mechanism, an impression device having a movement toward and away from the type carrier and the time printing devices, and mechanism, also controlled by said cam, for operating the impression devices in advance of the operation of the locking bolt.

24. In a key-controlled lock, the combination with a movable character printing segment, a series of keys, one for each character, said keys differentiated from each other in respect to the relative lengths thereof and each adapted to move said segment into position to print the character corresponding to the length of the particular key employed, a clock mechanism, time printing devices under the control of said clock mechanism, an impression device having movement toward and away from the said segment and printing devices, whereby the character of the key and the time of the operation is simultaneously recorded, a locking bolt adapted to be operated by each key said impression device being operated by the key in advance of the operation of the bolt.

25. In a recording lock having a series of keys of varying length, a segment carrying characters representing, respectively, the different keys, and printing segment actuating means arranged to be engaged and set to varying positions according to the length of the keys while the keys are being inserted in the lock, a series of V-shaped notches in said segment, a platen operated in printing direction positively by each key, and a guide pin on the platen adapted to move into a notch in the segment to bring the character thereon corresponding to the particular key employed into alinement for recording.

26. In a recording lock, the combination with a swinging type carrier provided with a curved line of type, keys differentiated as to length thereof, a type carrier actuating means arranged to be engaged by the keys while being inserted in the lock and adapted to swing said type carrier into position to print the initial of the particular key employed, of a combined hour and minute printing wheel, time mechanism for turning said wheel, a platen for taking an impression from the type carrier and the hour and minute wheel, the key operating to positively move the platen in printing direction the type carrier having a series of notches, and a guide pin on the platen adapted to move into the notches on the type carrier to bring a type thereon into line with the type on the hour and minute wheel, so that the record can be made in alinement.

27. In a recording lock having a series of keys differentiated as to length thereof, the combination with a swinging carrier provided with a series of characters, one for each key, means actuated into position by the keys while being inserted in the lock for moving said carrier a distance according to the length of the particular key employed, a time mechanism, a combined hour and minute printing wheel controlled by said mechanism, a day wheel, means for moving said day wheel one numeral forward at each rotation of the hour and minute wheel, a manually operated month wheel, the said minute, hour, day and month wheels being arranged to aline the printing type of each with the printing position of the character on the type carrier, and a key-operated printing platen for taking an impression from the alined type carrier and printing wheels the key operating to positively move the platen in printing direction.

28. In a recording lock having a series of differentiated keys, the combination with a type carrier provided with a series of characters, one for each key, said character being swung into various positions by the rotary movement of the keys, and according to the particular key employed, a time mechanism, a combined hour and minute printing wheel controlled by the time mechanism, a day wheel, means whereby said day wheel is moved one numeral forward upon each rotation of the hour and minute wheel, a manually operated month wheel, a key-operated paper and ink-ribbon feeding device, a key-operated printing platen adapted to print the minute, hour, day, and month, and operating key character, each time the lock is operated to lock or unlock the door.

29. In a recording door lock having a series of differentiated keys, the combination with a type carrier having a plurality of characters representing the keys, a series of beveled notches in said carrier, a time mechanism, a combined hour and minute printing wheel controlled by said time mechanism, a day wheel, means for turning said day wheel one number forward upon each rotation of the hour and minute wheel, a manually operated month wheel, a key-operated paper and inking ribbon feeding device, and a key-operated platen adapted to print the minute, hour, day and month, and operating key character, each time the lock is operated to lock or unlock the door, said platen having a guide pin adapted to move into a beveled notch in the type carrier to aline a character thereon with the type on the printing wheels.

30. In a recording door lock having a series of differentiated keys, a bar carrying a series of stepped cams, adapted to move inwardly distances according to the length of the key employed, a tumbler connected with said bar so as to rotate therewith, said tumbler having a lug, a type carrier having a series of characters representing the various keys, said type carriers coöperating with the stepped cams and being moved thereby, a clock mechanism, a combined hour and minute printing wheel under the control of said time mechanism, a day wheel, means for moving said day wheel forward one numeral upon each operation of the minute and hour wheel, a manually operated month wheel, a key operated paper and inking ribbon feeding device, a platen coöperating with the type carrier and the printing wheel to print the minute, hour, day and month, and operated key character, each time the lock is operated to lock or unlock the door, the said platen having an eccentric cam that is adapted to be engaged by the lug on the tumbler, whereby the platen is operated.

31. In a recording lock, the combination with a key operated locking bolt, of recording mechanism, and means for actuating it by the movement of the key independently and in advance of the operation of the bolt, said mechanism including a time, date and key recorder.

32. In a recording lock, the combination with a key operated locking bolt, of recording mechanism, including an independently-driven time indicator, a key recorder coöperating therewith, a record feed, and means for actuating the key recorder by the key independently and in advance of the movement of the bolt.

33. In a recording lock, the combination with a key operated locking bolt, of recording mechanism, and differentiated keys for actuating it independently and in advance of the bolt, said mechanism including a time, date and key recorder.

34. In a key operated door lock, the combination of a series of initial keys differentiated as to the lengths thereof, a printing segment carrying corresponding printing initials and beveled spacing pins, means engaged by the keys while being inserted in the lock and shifted thereby into position for moving the printing segment to printing position according to the length of the key a guide pin under the control of the keys adapted to guide the segment when the platen is operated into alined printing position corresponding to the initial of the key used, a locking bolt, and a platen, said platen arranged to be operated by the keys in advance of the operation of the bolt.

35. In a recording lock, a key-actuated locking bolt, said bolt being positively operated by the key to project and also to withdraw the same, a detent arranged to engage the bolt when in projected position, and also when in retracted position, to lock the same in such positions, the bolt operating key operating in advance of the movement of the bolt in either direction to release said detent, and a recording mechanism also operated by the key, and in advance of the operation of the bolt, for recording the identity of the particular key employed to operate the bolt.

In testimony whereof I affix my signature in the presence of two witnesses.

HENRY S. HALLWOOD.

Witnesses:
  C. C. SHEPHERD,
  FRANCES H. SHEPHERD.